UNITED STATES PATENT OFFICE.

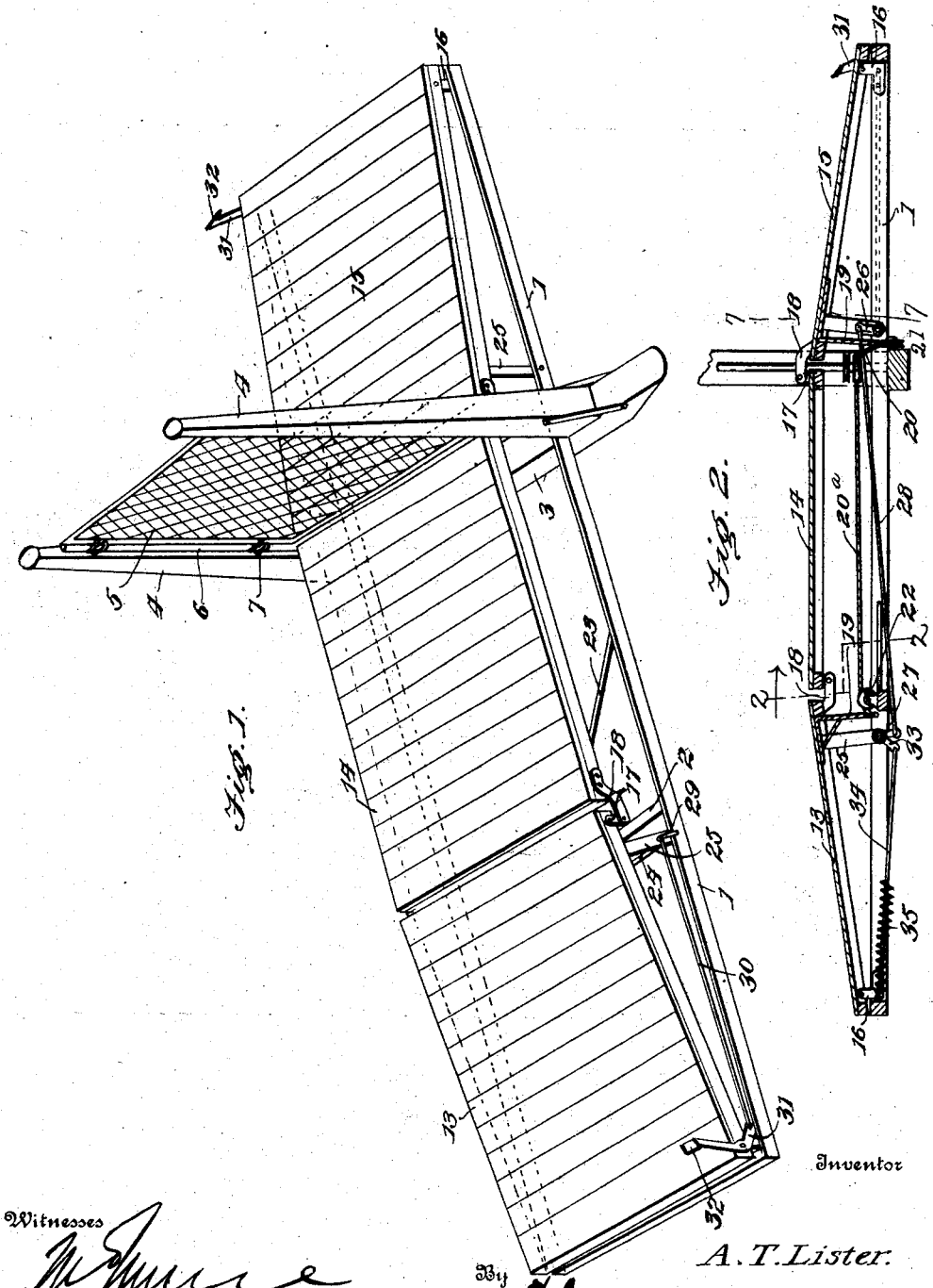

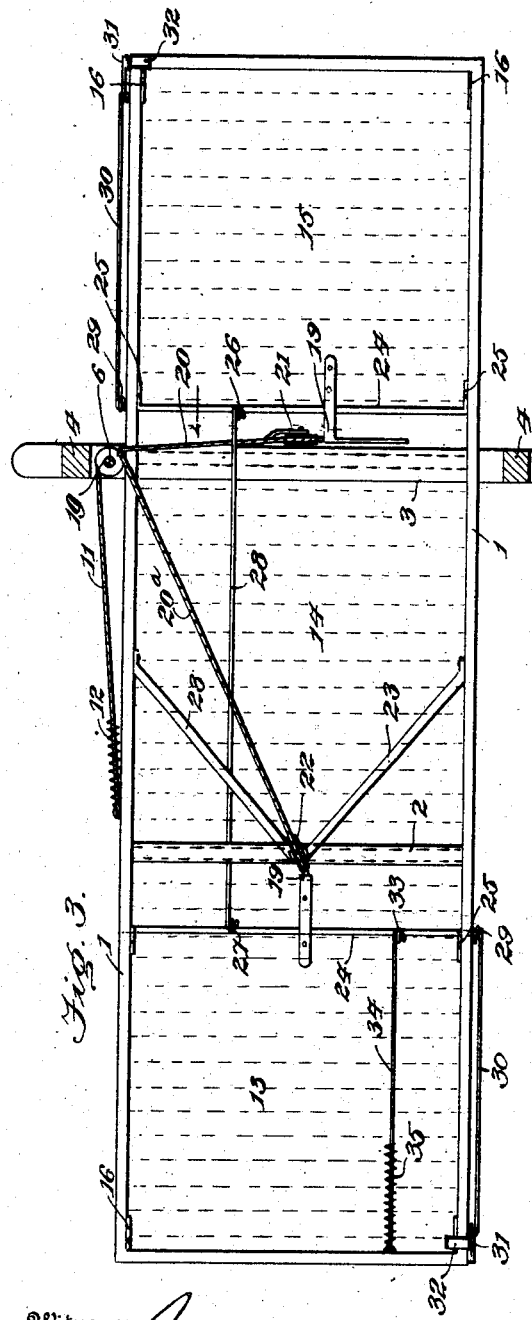

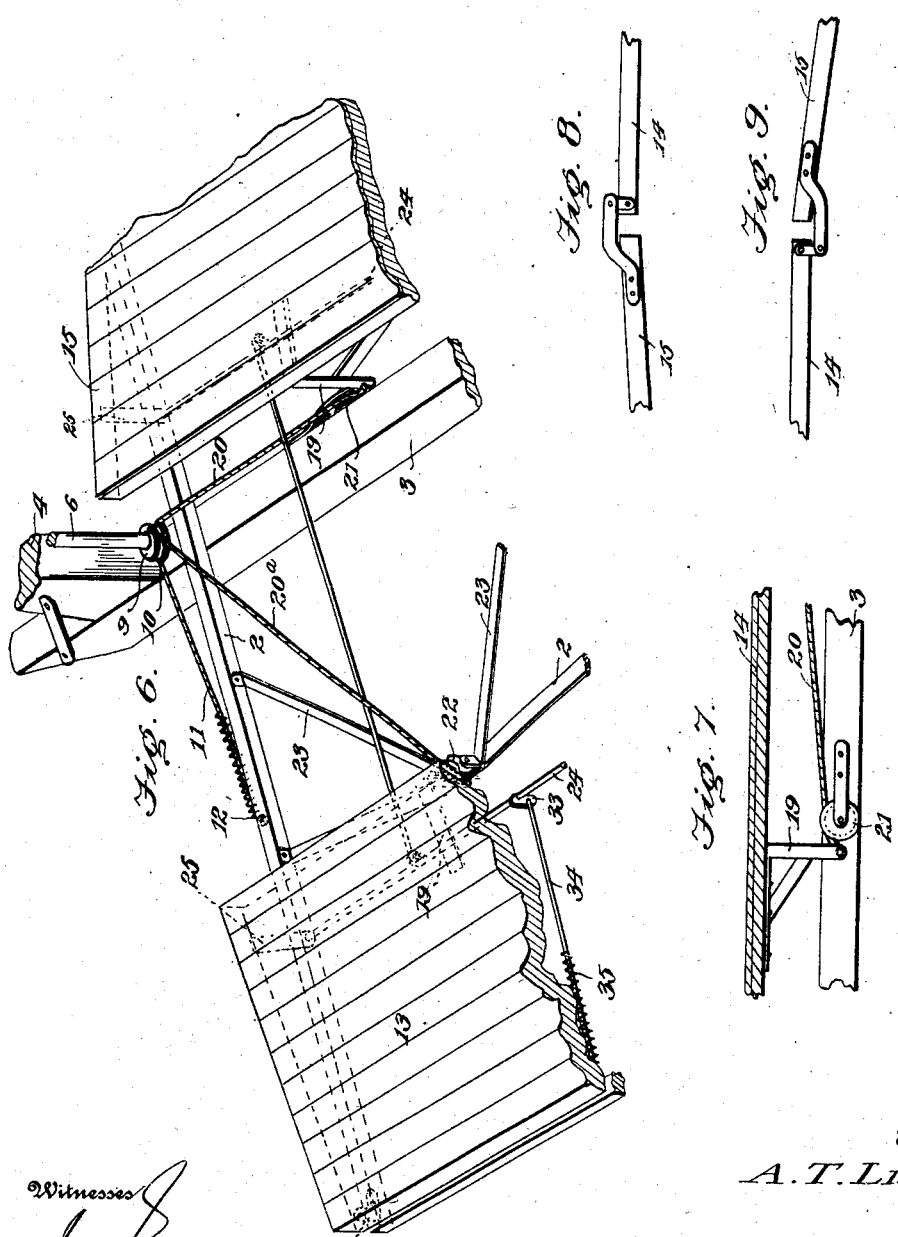

ANSON T. LISTER, OF CEDAR VALE, KANSAS.

AUTOMATIC GATE.

No. 902,095.  Specification of Letters Patent.  Patented Oct. 27, 1908.

Application filed November 22, 1907. Serial No. 403,343.

*To all whom it may concern:*

Be it known that I, ANSON T. LISTER, citizen of the United States, residing at Cedar Vale, in the county of Chautauqua and State of Kansas, have invented certain new and useful Improvements in Automatic Gates, of which the following is a specification.

The present invention relates to improvements in gates of that character which are commonly employed upon farms and the like, and more particularly to a novel means for automatically opening and closing the gate when a person approaches and leaves the same.

The invention further contemplates the provision of a novel locking mechanism for preventing accidental opening of the gate by live stock.

The object of the invention is to design a gate actuating mechanism which will operate in a positive manner to automatically open and close the gate when desired, but which can not be operated by live stock and will securely retain the same within the closure.

For a full description of the invention and the merits thereof, reference is to be had to the following description and accompanying drawings, in which:

Figure 1 is a perspective view of the improved gate. Fig. 2 is a longitudinal sectional view through the same, the gate being removed. Fig. 3 is a top plan view of the frame, the hinged platforms being shown in dotted lines. Fig. 4 is a transverse sectional view on the line 2—2 of Fig. 2. Fig. 5 is a detail view of one of the intermediate cross bars. Fig. 6 is a detail perspective view of the gate operating mechanism, parts being removed. Fig. 7 is a transverse sectional view on the line 7—7 of Fig. 2. Figs. 8 and 9 are detail views of the hinge connection between the platforms.

Corresponding and like parts are referred to in the following description and indicated in all the views of the drawings by the same reference characters.

Referring to the drawings the numeral 1 designates the base which is in the nature of a rectangular frame and is designed to be supported upon a firm foundation of gravel or similar material. The longitudinal side pieces of the basal frame 1 are connected at intermediate points in their length by a pair of cross bars 2 and 3, the ends of the latter projecting beyond the sides of the base and carrying the upright standards 4 upon which the gate 5 is mounted. This gate may be of any approved design and construction and is rigidly attached at its hinged end to a vertical rod 6 passing loosely through eyes 7 projecting from one of the standards 4. The opposite standard 4 carries the stops 8 designed to engage the swinging end of the gate and limit the movement thereof in one direction. It will be observed that the vertical rod 6 extends downwardly below the gate and carries a pair of pulleys 9 and 10, the lower pulley 10 coöperating with a cable 11 and a spring 12 secured to the basal frame to hold the gate 5 normally in a closed position and in engagement with the stops 8.

Three platforms 13, 14 and 15 are mounted upon the base 1, the intermediate platform 14 being normally held in an elevated position with respect to the base while the end platforms 13 and 15 are loosely connected to the intermediate platform and inclined downwardly from the same toward opposite ends of the base 1. The outer ends of the end platforms 13 and 15 are pivotally mounted between plates 16 projecting upwardly from the basal frame 1, while the inner ends of the said platforms are loosely connected by means of link members 17 to offset arms 18 projecting from the opposite ends of the intermediate platform 14. This construction admits of the said platforms being forced together when moved downwardly and spreading apart when moved upwardly as will be readily apparent. Pendent from the inner and swinging end of each of the platforms 13 and 15 is an arm 19, the said arm pendent from the platform 15 having the extremity thereof connected to a cable 20 passing over a guide member or pulley 21 journaled upon one side of the cross bar 3 and having an operative connection with the upper pulley 9 upon the vertical rod 6. In a similar manner the arm 19 pendent from the platform 13 has the extremity thereof connected to a cable $20^a$ passing around a guide member or pulley 22 mounted upon the cross bar 2 and also having an operative connection with the upper pulley 9 upon the vertical rod 6. As shown in the drawings the cross bar 2 is depressed at its central portion and the pulley 22 is journaled between upward projections at the extremities of diagonal braces 23. With this construction it will be readily apparent that when a weight is superposed upon either of the platforms and tension thereby produced in the cable 20 or $20^a$, the said tension operates to rotate the vertical rod 6 and swing the gate 5 in an open position against the action of the spring 12. As soon however as this superposed weight is removed from the platforms the said spring 12 will operate to close the gate and to again elevate the platforms into an operative position.

For the purpose of preventing accidental opening of the gate by live stock which might stray upon the platforms a locking mechanism is utilized for holding the platforms in an elevated position, suitable trips being provided whereby a person can release the locking mechanism with his foot before walking upon the platforms. A rock shaft 24 is journaled between the opposite sides of the base 1 under the inner or swinging end of each of the end platforms 13 and 15, the said rock shafts carrying supporting members 25 designed to be swung upwardly under the platforms in such a manner as to hold the same in an elevated position and prevent any depression of the same by a superposed weight. In order to bring about a simultaneous movement of the rock shafts 24 in opposite directions, one of them is provided with an upwardly extending crank arm 26 while the opposite shaft is provided with a downwardly extending crank arm 27, the said crank arms being connected by a rod 28. It will also be observed that one end of each of the rock shafts 24 is provided with a crank arm 29 and that the said crank arms are connected by links 30 to trip levers 31 pivoted at opposite ends of the basal frame 1. These trip levers 31 are shown in the present instance as of a bell crank formation and as provided with foot pieces 32 by means of which they can be readily actuated by the foot of the operator. One of the rock shafts 24 is also provided with a crank arm 33 connected by a cable 34 to a spring 35 which operates to normally hold the supporting members 25 in an upright position so as to lock the platforms against being depressed.

In the operation of the device as a person approaches the gate he first releases the locking mechanism by operating one of the trip levers 31 with his foot and then walks upon the platforms. His weight tends to depress the said platforms and this downward movement of the same operates in the manner hereinbefore set forth by swinging the gate into an open position. As soon however as the operator passes off the platforms and his weight is removed from the same the spring 12 again closes the gate and lifts the platforms into normal position. The locking mechanism is then operated through the medium of the spring 35 and the supporting members 25 swung upwardly so as to prevent operation of the gate by any live stock which might wander upon the platforms.

Having thus described the invention, what is claimed as new is:

1. In a device of the character described, the combination of a gate, a base, end platforms hinged to the base, an intermediate platform loosely connected to the end platforms and normally held in an elevated position, the end platforms and intermediate platform being adapted to be forced together when depressed and separated when moved upwardly into normal position, and means for opening the gate when the platforms are depressed.

2. In a device of the character described, the combination of a gate, a base, end platforms hinged to the base, an intermediate platform, coöperating hangers and arms loosely connecting the intermediate platform to the end platforms and admitting of the platforms being forced together when depressed and spreading apart when elevated in normal position, and means for opening the gate when the platforms are depressed.

3. In a device of the character described, the combination of a gate, a base, guide members upon the base, end platforms hinged to the base, an intermediate platform loosely connected to the end platforms and normally held in an elevated position, arms pendent from the end platforms, and cables connected to the pendent arms and passing over the before mentioned guide members, the said cables having an operative connection with the gate for opening the same when the platforms are depressed.

4. In a device of the character described, the combination of a gate, a pulley rigid with the pivot end of the gate, a base, a swinging platform mounted upon the base, a pulley journaled upon the base, an arm pendent from the swinging platform, and a cable connected to the arm and passing around the pulley upon the base and having an operative connection with the pulley upon the gate.

5. In a device of the character described, the combination of a gate, a base, a pair of end platforms hinged to the base, an intermediate platform loosely connected to the end platforms and normally held in an elevated position, means for opening the gate when the platforms are depressed, a rock shaft under the swinging end of each of the end platforms, supporting members carried by the rock shafts for engaging the end platforms to hold the platforms in an inoperative position, connecting means between the rock shafts for causing the same to operate simultaneously, and a trip mechanism for moving the rock shafts to swing the supporting members into an inoperative position.

6. In a device of the character described, the combination of a rectangular frame having the side pieces connected by a pair of cross bars, standards carried by one of the cross bars, a gate mounted between the standards, a guide member upon each of the cross bars, an end platform hinged to each end of the frame, an intermediate platform loosely connected to the end platforms and normally held in an elevated position, an arm pendent from each of the end platforms, and cables connected to the arms and passing over the guide members upon the respective cross bars, the said cables having an operative connection with the gate for opening the same when the platforms are depressed.

7. In a device of the character described, the combination of a gate, pulleys for actuating the gate, a spring and cable coöperating with one of the pulleys to hold the gate in a closed position, a cable having an operating connection with the opposite pulley, and a movable platform coöperating with the cable to open the gate against the action of the before mentioned spring.

8. In a device of the character described, the combination of a base, a swinging gate carried by the base, a pair of pulleys rigid with the hinged end of the gate, a cable and spring coöperating with one of the pulleys to hold the gate in a closed position, end platforms hinged to the base, an intermediate platform loosely connected to the end platforms and normally held in an elevated position, arms pendent from the end platforms, and cables connected to the arms and having an operative connection with the opposite pulley for opening the gate when the platforms are depressed.

9. In a device of the character described, the combination of a rectangular frame having the side pieces connected by a pair of cross bars, standards carried by one of the cross bars, a gate mounted between the standards, a pulley upon each of the cross bars, a swinging platform hinged to each end of the frame, and cables passing around the pulleys and producing an operative connection between the swinging platforms and the gate.

In testimony whereof I affix my signature in presence of two witnesses.

ANSON T. LISTER. [L. S.]

Witnesses:
J. W. BUCKLEY,
FAY WEBB.